Figure 7:
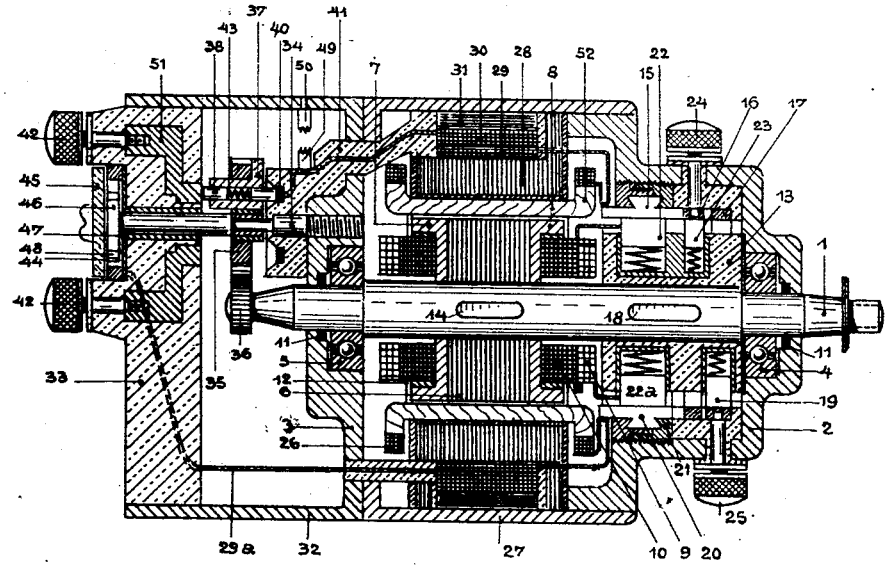

July 7, 1925.  
E. GRAICHEN  
1,545,422

DYNAMO ELECTRIC MACHINE

Filed May 9, 1923

Inventor:
Erich Graichen.
Attorney:

Patented July 7, 1925.

1,545,422

UNITED STATES PATENT OFFICE.

ERICH GRAICHEN, OF ALTENBURG, GERMANY.

DYNAMO-ELECTRIC MACHINE.

Application filed May 9, 1923. Serial No. 637,831.

*To all whom it may concern:*

Be it known that I, ERICH GRAICHEN, a citizen of the German Republic, residing at Altenburg, Germany, have invented certain new and useful Improvements in Dynamo-Electric Machines, of which the following is a specification.

The invention relates to dynamo-electric machines, and its object is to provide a machine capable of producing two kinds of electric current, namely a direct current, generally of moderate or low potential, and a high tension alternating current, such currents being, for example, suitable for serving the lamps and the motor ignition device of an automobile vehicle driven by an internal combustion engine.

Separate machines have heretofore commonly been used for this purpose, though it has also been proposed to house both such machines in a single casing, the machines being, nevertheless, independently working units.

In my invention there is only one machine, with a single shaft. This has important advantages in regard to compactness and facility of inspection. Duplication of many parts is avoided. For example, instead of two pairs of ball bearings for two shafts, one pair will do; there is only one rotor, and only one stator.

In one form of construction the machine is compound wound, with an annular stator within which the field magnet rotates, the transformer coils and condenser being disposed around the stator. The stator has an armature winding of known type, with the coils connected to the inwardly facing segments of a commutator, wiped by brushes on the rotating shaft. The brushes are carried by a fibre holder fixed to the shaft, and are thrust outwards by springs. In addition there are brushes on this holder, which bear against two fixed slip rings surrounding the shaft, and are connected to the commutator brushes; these slip rings are connected to the terminals of a lamp circuit. Alternatively there may be a slip ring or slip rings on the brush holder, with a brush or brushes attached to the casing and connected to the circuit.

The field magnets on the shaft have a series and a shunt winding, the former for keeping the pressure constant. The main poles are laminated, of soft iron stampings insulated by shellac, and at the two outer sides they have permanent magnets, or hardened sheet steel laminations, to assist self-excitation. Around the poles there are bare copper rings, to reduce eddy currents and heating, and also to prevent deterioration of the commutation by the damping effect of the excitation circuit.

As the stator winding generates alternating current, it is tapped at the ends of a diagonal line and joined to the primary of the transformer. If with the lamination of the stator referred to the eddy currents are too large, I may use a horizontal lamination for the transformer, separated from the stator by a layer of non-magnetic material.

Around the transformer there is a condenser built up of sheets of foil, with paraffin dielectric, this transformer serving to strengthen the spark.

A pinion on the shaft drives a gear wheel at a speed corresponding to that of the cam shaft of the motor, and this gear wheel carries two contacts, one wiping a contact ring connected to the secondary of the transformer, and the other wiping the segments of the distributor connected to the spark plugs.

There is a make and break device in the ignition circuit, comprising several cams on a disk rotated by the gear wheel, running in a bush or ball bearing. The make and break, in parallel with the primary, interrupts the primary as follows: When open, the current flows through the primary. When closed, the current goes through the interrupter, owing to the higher resistance of the primary. The field of the primary collapses, and generates an induced current in the secondary.

The casing is entirely closed, and cylindrical. The cylindrical wall is of cast steel, and the covers of aluminium.

A machine embodying the novel features referred to is illustrated in the accompanying drawing in which:

Fig. 1 is a longitudinal section of such machine.

Figure 2:
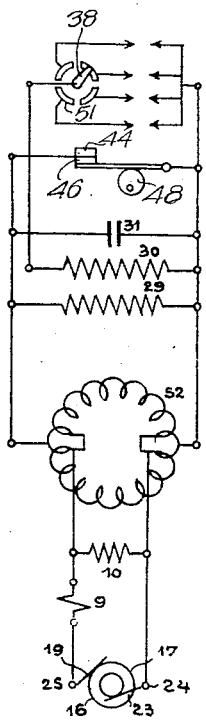

Fig. 2 being a diagram showing the arrangement of the circuits.

In the drawing 1 designates the shaft, for which the covers 2 and 3 of the casing have ball bearings 4 and 5. Upon this shaft are the main field magnets 6, which are laminated and consist of soft iron plates insulated from each other by means of shellac or the like. At the sides of these main poles 6 there are permanent magnets 7 and 8. The main poles are compound wound with series coils 9 and shunt coils 10. Bare copper rings 12 are placed around the poles to prevent eddy currents and the heating arising from such currents. The poles are fixed to the shaft by means of a key 14. Felt packing rings 11 are provided outside the ball bearings.

Between the cover 2 and the rotor, a brush holder or box 13 of fibre is fixed to the shaft by a key 18. Around the brush holder there are a commutator 15 and two stationary slip rings 16, 17. The commutator is built up in the usual way of copper segments dovetailed into a holder, the latter being, in the improved machine, composed of two rings 20 and 21, screwed one to the other, and screwed collectively into the casing. Brushes 22, 22ª are held by springs in contact with the commutator, and brushes 19 and 23 are similarly held in contact with the slip rings 16 and 17 respectively. The brushes 19 and 23 and the slip rings supply the direct current from the commutator to two terminals 24 and 25, to which the lamp circuit is connected.

Around the rotor the stator 26 is fixed to the wall 27 of the casing, the stator being laminated and built up of iron stampings 28. Facing the poles, the stator has a winding divided up into a large number of coils embedded in slots in the stampings 28, these coils being joined to the commutator bars in the usual manner.

At the outer circumference of the stator the stampings are in part cut away to make room for the primary 29 and secondary 30 of a transformer, and for a condenser 31 laid round the primary.

Fixed to the cover 3 is a cylindrical box 32 forming an extension of the casing and closed by a plate 33 of fibre. Fixed to the cover 3, there is also a pivot 34, on which a toothed wheel 35 is rotatable. This wheel meshes with a smaller toothed wheel 36 fixed to the shaft 1, the wheels being so proportioned that the wheel 35 makes the same number of revolutions as the cam shaft of the internal combustion engine. The wheel 35 carries a fibre plug 37 having a bore parallel with the pivot 34, and in this bore there are two carbon contacts 38, 39, projecting at opposite sides of the wheel. The contact 39 slides on a contact ring 40, which is insulated by a fibre block 41 from the cover 3. The contact ring 40 is connected to the secondary of the transformer. The carbon contact 38 sweeps over the segmental contacts 51 of the distributor. These are embedded in the plate 33 and are connected to the terminals 42 of the ignition circuit. The contacts 38 and 39 are thrust outwards from each other by a spring 43.

To increase the transformer voltage there is a make-and-break device 44, 46, 48. The metal ring 44 lies within a recess in the plate 33, behind a cover 45; the cam 46, 48 serves for adjusting for advanced, normal or retarded spark. By means of the cam 48 the make and break device short circuits the primary at intervals in the course of its rotation.

To prevent sparking inside the casing there is a safety spark gap in the connection between the secondary and the ring 40. This gap is formed between a terminal 49 on the connecting wire, and an earthed terminal 50 fixed to the casing.

The connections are shown diagrammatically in Fig. 2.

It will be seen that the whole mechanism is disposed very compactly in a single casing, with a single driving shaft, which is a great advantage in regard to economy of space, and convenience.

Without departing from the principle of the invention, the field magnet may be made stationary, and the armature rotatable, together with its coils for direct and alternating currents, and the commutator.

What I claim as my invention and desire to secure by Letters Patent of the United States is:—

1. A dynamo-electric machine for generating direct and alternating current, comprising a field magnet system; a stator; an armature winding on the stator; a commutator; brushes for taking direct current from said armature winding; a transformer disposed around the stator, and having a primary and a secondary coil; a make and break device connected in parallel with said primary coil; and means for supplying said primary coil with alternating current tapped off said armature winding.

2. A dynamo-electric machine for generating direct and alternating current, comprising a field magnet system; a stator; an armature winding on the stator; a commutator and brushes for taking direct current from said armature winding; a transformer disposed around the stator, and having a primary and a secondary coil; a make and break device connected in parallel with said primary coil; a condenser disposed around the transformer and connected in parallel to said primary coil, and means for supplying said primary coil with alternating current derived from said armature winding.

3. A dynamo-electric machine for generating direct and alternating current, comprising a rotor; a field magnet system on the rotor; a stator; a single armature winding on the stator; a stationary commutator; brushes for taking direct current from said armature winding; a transformer disposed around the armature winding and having a primary and a secondary coil; a condenser disposed around the transformer; a make and break device connected in parallel with said primary coil; and means for supplying said primary coil with alternating current derived from said armature winding.

In witness whereof I have signed this specification.

ERICH GRAICHEN.

Witnesses:
RUDOLPH FRICKE,
ALFRED ZÜCKER.